United States Patent
Kanai

(10) Patent No.: US 8,274,671 B2
(45) Date of Patent: Sep. 25, 2012

(54) PRINTING SYSTEM, CONTROL METHOD AND PROGRAM HOLDING PRINT INFORMATION FOR EXECUTING THE OFF-LINE PROCESS WHEN THE PRINTING PROCESS IS TO BE SEPARATELY EXECUTED

(75) Inventor: Yasunori Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 12/350,165

(22) Filed: Jan. 7, 2009

(65) Prior Publication Data

US 2009/0190167 A1    Jul. 30, 2009

(30) Foreign Application Priority Data

Jan. 28, 2008    (JP) ................... 2008-016841

(51) Int. Cl.
*G06F 3/12*    (2006.01)
*G06K 15/02*    (2006.01)
(52) U.S. Cl. ..................... 358/1.13; 358/1.15
(58) Field of Classification Search .............. 358/1.9, 358/2.1, 3.24, 1.12, 1.13, 1.18, 501, 537, 358/538, 401, 434–439, 442, 452, 453, 468, 358/296, 304; 399/407–410
See application file for complete search history.

(56) References Cited

U.S. PATENT DOCUMENTS

| | | | |
|---|---|---|---|
| 6,922,260 B2 * | 7/2005 | Nishikawa et al. | 358/1.18 |
| 8,027,044 B2 * | 9/2011 | Sato et al. | 358/1.12 |
| 8,089,642 B2 * | 1/2012 | Taira | 358/1.13 |
| 2004/0190057 A1 | 9/2004 | Takahashi et al. | |
| 2005/0105116 A1 * | 5/2005 | Kobashi | 358/1.12 |
| 2007/0008589 A1 * | 1/2007 | Ushio et al. | 358/304 |
| 2009/0279114 A1 * | 11/2009 | Sakurai | 358/1.12 |
| 2011/0058840 A1 * | 3/2011 | Tsujita | 399/408 |

FOREIGN PATENT DOCUMENTS

JP    2007-60097 A    3/2007

OTHER PUBLICATIONS

Japanese Office Action dated Jun. 15, 2012 issued in corresponding Japanese Patent Application No. 2008-016841.

* cited by examiner

*Primary Examiner* — Scott A Rogers
(74) *Attorney, Agent, or Firm* — Fitzpatrick, Cella, Harper & Scinto

(57) ABSTRACT

A printing system having a printing apparatus and a post-processing apparatus connected to the printing apparatus, and a method for controlling the printing system, are provided. When an in-line job is received that is set to perform a printing process by the printing apparatus and a post-process by the post-processing apparatus with respect to a sheet printed by the printing process, it is determined whether or not the in-line job is to be separated into the printing process and an off-line process of performing the post-process by the post-processing apparatus without performing the printing process. When it is determined that the separation is to be performed, the printing apparatus is caused to execute the printing process and print information for executing the off-line process is held. When a user's instruction to execute the off-line process is received, the off-line process is executed with respect to the sheet printed by the printing process.

11 Claims, 14 Drawing Sheets

SELECTION OF SHEET PROCESSING TYPE

SELECT THE TYPE OF A SHEET PROCESS TO BE EXECUTED
FOR A JOB TO BE PROCESSED

| STAPLE | PUNCH | TRIM |
| SHIFT DISCHARGE | SADDLE STITCH | FOLD |
| GLUE BIND (1) (CASE BIND) | | LARGE-VOLUME STACK |
| GLUE BIND (2) (PAD BIND) | | |
| INSERT | | MANUAL SETTING |

CANCEL   OK

FIG. 13

SELECTION OF SHEET PROCESSING TYPE

SELECT THE TYPE OF A SHEET PROCESS TO BE EXECUTED FOR A JOB TO BE PROCESSED

- STAPLE
- PUNCH
- TRIM
- SHIFT DISCHARGE
- SADDLE STITCH
- FOLD
- GLUE BIND (1) (CASE BIND)
- GLUE BIND (2) (PAD BIND)
- INSERT

1301
- JOB-SEPARATED SHEET PROCESS
- LARGE-VOLUME STACK
- MANUAL SETTING

CANCEL    OK

7001

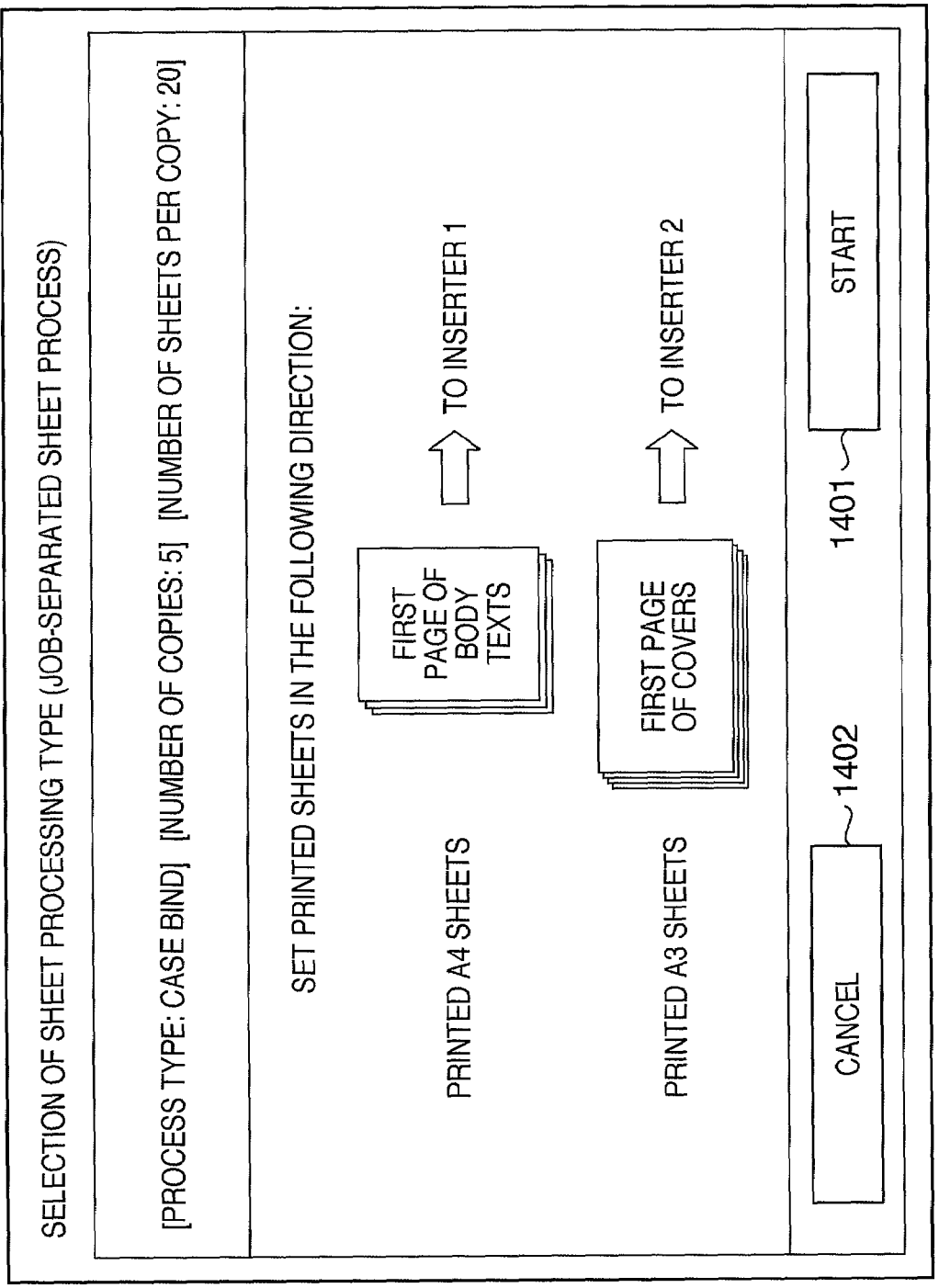

PRINTING SYSTEM, CONTROL METHOD AND PROGRAM HOLDING PRINT INFORMATION FOR EXECUTING THE OFF-LINE PROCESS WHEN THE PRINTING PROCESS IS TO BE SEPARATELY EXECUTED

BACKGROUND OF THE INVENTION

1. Field of the Invention

The present invention relates to a printing system comprising a printing apparatus and a post-processing apparatus connected to the printing apparatus, and a method for controlling the system.

2. Description of the Related Art

To compete with the conventional printing industry, a Print On Demand (POD) printing system has been recently proposed in which a printing apparatus employing an electrophotographic method or a printing apparatus employing an ink-jet method is utilized (see US Patent Pre-Grant Publish No. US-2004-0190057). Such a POD printing system does not require an offset plate making process or other complicated tasks.

However, in view of the level of its practical products, such a POD printing system still has plenty of room for improvement. For example, in conventional printing systems, a post-process by an in-line finisher connected to a printer (a finisher (post-processing apparatus) that is linked to a printer via a paper path) cannot be used without being accompanied by printing by the printer. Therefore, it is desirable that a post-process by an in-line finisher connected to a printer can be utilized without being accompanied by printing by the printer.

Also, when printing is performed using a printer connected to such an in-line finisher, the printing specifications of the printer are determined, considering post-processing for a printed material, that is, the settings of the connected in-line finisher. However, when it is desired to perform only printing using the printer without performing post-processing, the limitation of the printing specifications based on the settings of the in-line finisher impairs the operability of the printer. Therefore, also in a printer thus connected to an in-line finisher, it is desirable to set the printing specifications irrespective of the settings of the in-line finisher.

SUMMARY OF THE INVENTION

An aspect of the present invention is to eliminate the above-mentioned problems with the conventional technology.

A feature of the present invention is that a post-process by a post-processing apparatus connected to a printing apparatus can be used without being accompanied by printing by the printing apparatus.

Another feature of the present invention is that when a received in-line job can be separated into two processes, that is, a printing process and a post-process, the printing apparatus can execute a printing process irrespective of the printing process of the in-line job.

According to an aspect of the present invention, there is provided a printing system having a printing apparatus and a post-processing apparatus connected to the printing apparatus, the system comprises:

a reception unit configured to receive an in-line job set to perform a printing process by the printing apparatus and a post-process by the post-processing apparatus with respect to a sheet printed by the printing process;

a job separation unit configured to determine whether or not the in-line job is to be separated into the printing process by the printing apparatus and an off-line process of performing the post-process by the post-processing apparatus without performing the printing process by the printing apparatus; and a print control unit configured to, in a case that the job separation unit determines that the separation is not to be performed, cause the printing apparatus to execute the printing process of the in-line job and the post-processing apparatus to execute the post-process of the in-line job, wherein in a case that the job separation unit determines that the separation is to be performed, the print control unit causes the printing apparatus to execute the printing process and holds print information for executing the off-line process, and the print control unit, when receiving a user's instruction to execute the off-line process, performs control such that the off-line process is executed with respect to the sheet printed by the printing process, based on the held print information.

According to an aspect of the present invention, there is provided a method for controlling a printing system having a printing apparatus and a post-processing apparatus connected to the printing apparatus, the method comprising:

a receiving step of receiving an in-line job set to perform a printing process by the printing apparatus and a post-process by the post-processing apparatus with respect to a sheet printed by the printing process;

a job separation step of determining whether or not the in-line job is to be separated into the printing process by the printing apparatus and an off-line process of performing the post-process by the post-processing apparatus without performing the printing process by the printing apparatus; and a print control step of, in a case that it is determined in the job separation step that the separation is not to be performed, causing the printing apparatus to execute the printing process of the in-line job and the post-processing apparatus to execute the post-process of the in-line job, wherein in a case that it is determined in the job separation step that the separation is to be performed, the print control step includes causing the printing apparatus to execute the printing process and holding print information for executing the off-line process, and the pint control step, when receiving a user's instruction to execute the off-line process, includes performing control such that the off-line process is executed with respect to the sheet printed by the printing process, based on the held print information.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing an exemplary setting screen that is displayed on a touch panel unit so as to cause the user to select the type of a sheet process to be executed with respect to a sheet that has been printed by the printing apparatus according to the embodiment.

FIG. 13 is a diagram showing an exemplary screen that is displayed on the touch panel unit in step S29 of FIG. 12 after a sheet process setting button is pressed down.

FIG. 14 is a diagram showing an exemplary screen that is displayed on the touch panel unit in step S29 after a "job-separated sheet process" button is pressed down in FIG. 13.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
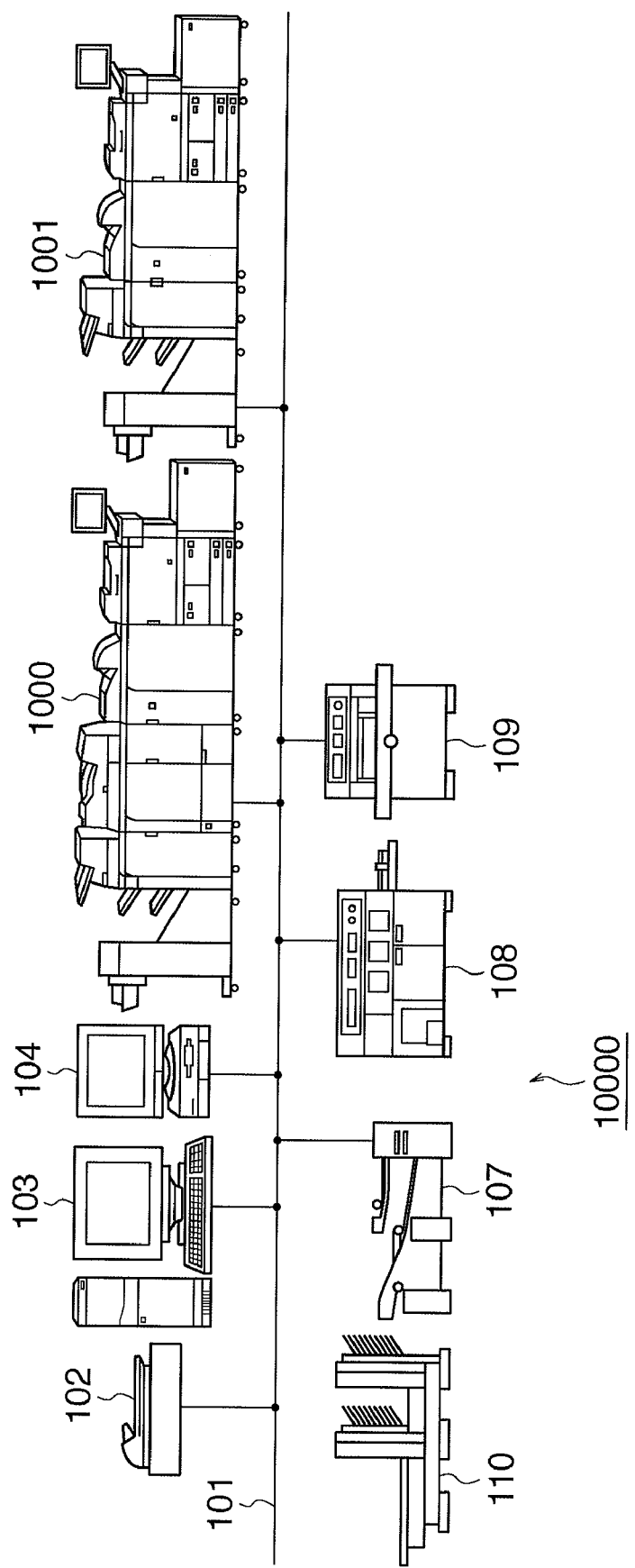
FIG. 1 is a diagram showing a configuration of a POD system according to an exemplary embodiment of the present invention.

FIG. 1 is a diagram showing a configuration of a POD system 10000 according to the exemplary embodiment.

In FIG. 1, the POD system 10000 has printing systems (printing process systems) 1000 and 1001, a scanner 102, a server computer 103 (PC 103), and a client computer 104 (PC 104). These are interconnected via a network 101. A paper folding device 107, a case binding device 108, and a trimmer 109 are also connected to the network 101. Reference numeral 110 denotes a saddle stitching device. Note that, here, the printing systems 1000 and 1001 are each a system having a printing apparatus, a stacker, and a bookbinding device as described below.

The PC 103 manages transmission and reception of data with respect to the apparatuses connected to the network 101. The PC 104 transmits image data via the network 101 to a printing apparatus 100 (FIG. 2) of a printing system or the PC 103. The paper folding device 107 performs a process of folding sheets that have been printed by the printing apparatus 100. The case binding device 108 performs a process of case-binding sheets that have been printed by the printing apparatus 100. The trimmer 109 performs a process of trimming sheets that have been printed by the printing apparatus 100, on a sheet-bundle-by-sheet-bundle basis, where each sheet bundle includes a plurality of sheets. The saddle stitching device 110 performs a process of saddle-stitching sheets that have been printed by the printing apparatus 100.

When post-processes by the paper folding device 107, the case binding device 108, the trimmer 109, the saddle stitching device 110 and the like are used, the user removes sheets that have been printed by the printing system 1000 or 1001. Thereafter, the user sets the removed sheets into a post-processing apparatus, which in turn executes a post-process. The devices included in the POD system 10000 of this embodiment other than the saddle stitching device 110 are connected to the network 101 and can perform data communication with each other.

Figure 2:
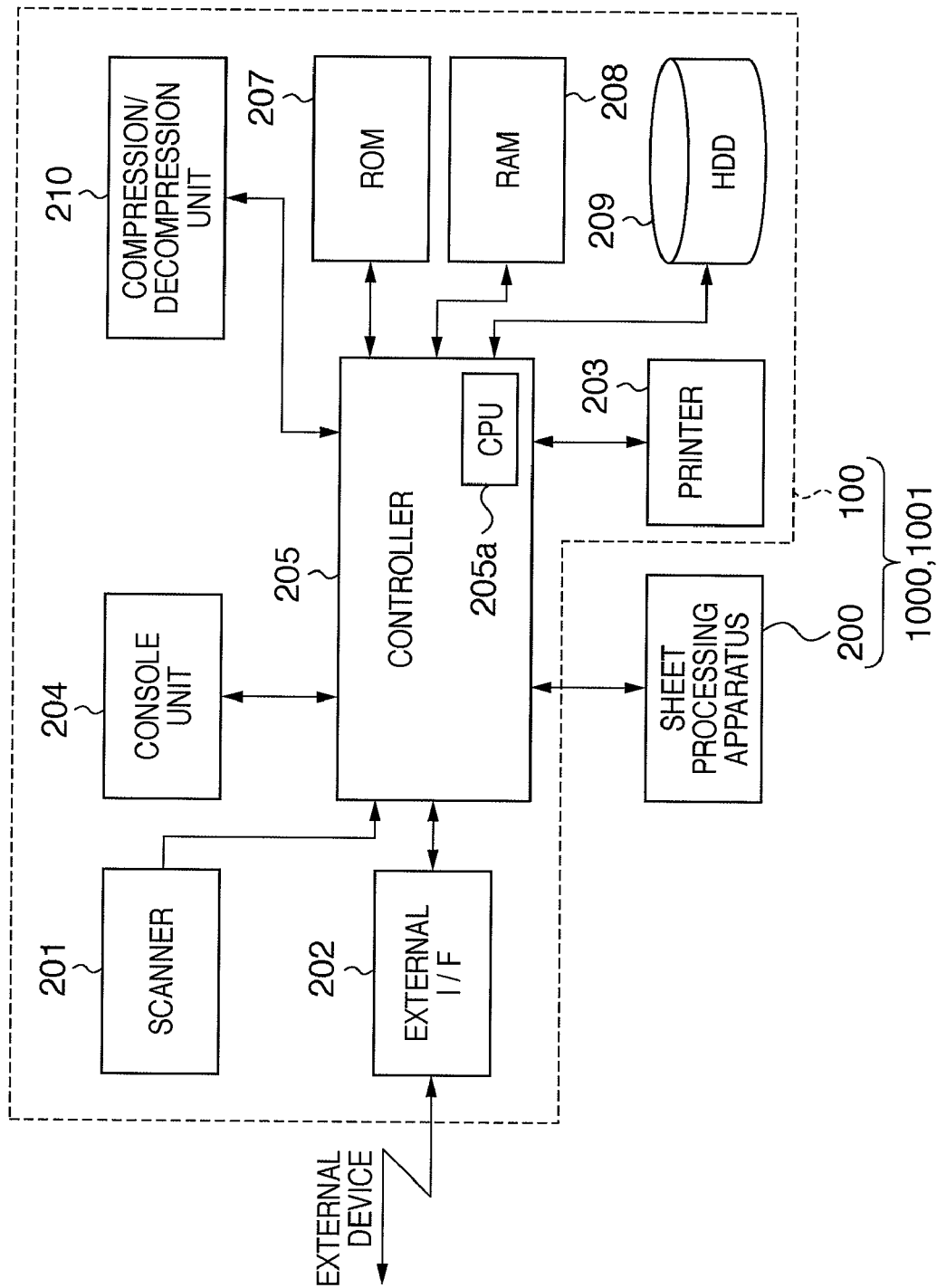
FIG. 2 is a block diagram for describing a hardware configuration of the printing system according to the embodiment.

FIG. 2 is a block diagram for describing a hardware configuration of the printing systems 1000 and 1001 according to the embodiment.

The printing systems 1000 and 1001 each have the printing apparatus 100 and a sheet processing apparatus 200. Note that it is assumed in this embodiment that, as the printing apparatus 100, a multi-function peripheral having a plurality of functions, such as a copier function, a printer function and the like, is used. However, the printing apparatus 100 may be a printing apparatus having a single function, for example, only a copier function or only a printer function.

Although the printing system 1001 according to this embodiment has the same mechanism as that of the printing system 1000, the present invention is not limited to this. Also, the configuration of this embodiment can be implemented if either of the printing systems 1000 and 1001 is provided.

Next, the configuration of the printing system 1000 will be described with reference to the block diagram of FIG. 2.

Units other than the sheet processing apparatus 200 included in the printing system 1000 are included in the printing apparatus 100. An arbitrary number of sheet processing apparatuses 200 can be connected to the printing apparatus 100. The printing systems 1000 and 1001 can each execute a sheet process with respect to sheets printed by the printing apparatus 100, using the sheet processing apparatus 200 connected to the printing apparatus 100. Note that the printing system 1000 can include only the printing apparatus 100 without connecting the sheet processing apparatus 200.

The sheet processing apparatus 200 is configured to be able to communicate with the printing apparatus 100. The sheet processing apparatus 200 receives an instruction from the printing apparatus 100 and executes a sheet process as described below. A scanner 201 reads and converts an image of an original into image data and transfers the image data to other units. An external interface (I/F) 202 performs data transmission and reception with respect to other apparatuses connected to the network 101. A printer unit 203 prints an image on a sheet based on received image data. A console unit 204 has a hard key input unit (key input unit) 7002 and a touch panel unit 7001 that are described below with reference to FIG. 7, and receives an instruction from the user via these units. The console unit 204 also provides various displays on a touch panel included in the console unit 204.

A controller 205 has a CPU 205a, such as a microcomputer or the like, and performs a centralized control of processes, operations and the like of the units included in the printing system 1000 (1001). The controller 205 also controls operations of the printing apparatus 100 and the sheet processing apparatus 200 connected to the printing apparatus 100. A ROM 207 stores various computer programs that are executed by the controller 205. For example, the ROM 207 stores a program for causing the controller 205 to execute various processes shown in a flowchart described below, and a display control program required to display various setting screens described below. The ROM 207 also stores a program for causing the controller 205 to perform an operation of interpreting Page Description Language (PDL) code data received from the PC 103 or 104 or the like and rendering the PDL code data to raster image data. In addition, the ROM 207 stores a boot sequence, font information and the like. A RAM 208 stores image data received from the scanner 201 or the external I/F 202, or various programs or setting information loaded from the ROM 207. The RAM 208 also stores information about sheet processing apparatuses 200 (e.g., the number of the sheet processing apparatuses 200 connected to the printing apparatus 100, information about a function of each sheet processing apparatus 200, the order of connection of the sheet processing apparatuses 200, etc.).

A Hard Disk Drive (HDD) 209 includes a hard disk, a drive unit for reading and writing data from and to the hard disk, and the like. The HDD 209 is a large-capacity storage device for storing image data that has been received from the scanner 201 or the external I/F 202 and compressed by a compression/decompression unit (CODEC) 210. The controller 205 can cause the printer unit 203 to print image data stored in the HDD 209, in accordance with an instruction from the user. The controller 205 also causes image data stored in the HDD 209 to be transmitted via the external I/F 202 and the network 101 to the PC 103 or an external apparatus, in accordance with an instruction from the user. The controller 205 can also similarly cause image data to be obtained via the network 101 and the external I/F 202 from the PC 103 or an external apparatus. The controller 205 can also search, via the external I/F 202, external apparatuses connected to the network 101. The compression/decompression unit 210 compresses and decompresses image data or the like stored in the RAM 208 and the HDD 209 using various compression techniques, such as JBIG, JPEG and the like.

Figure 3:
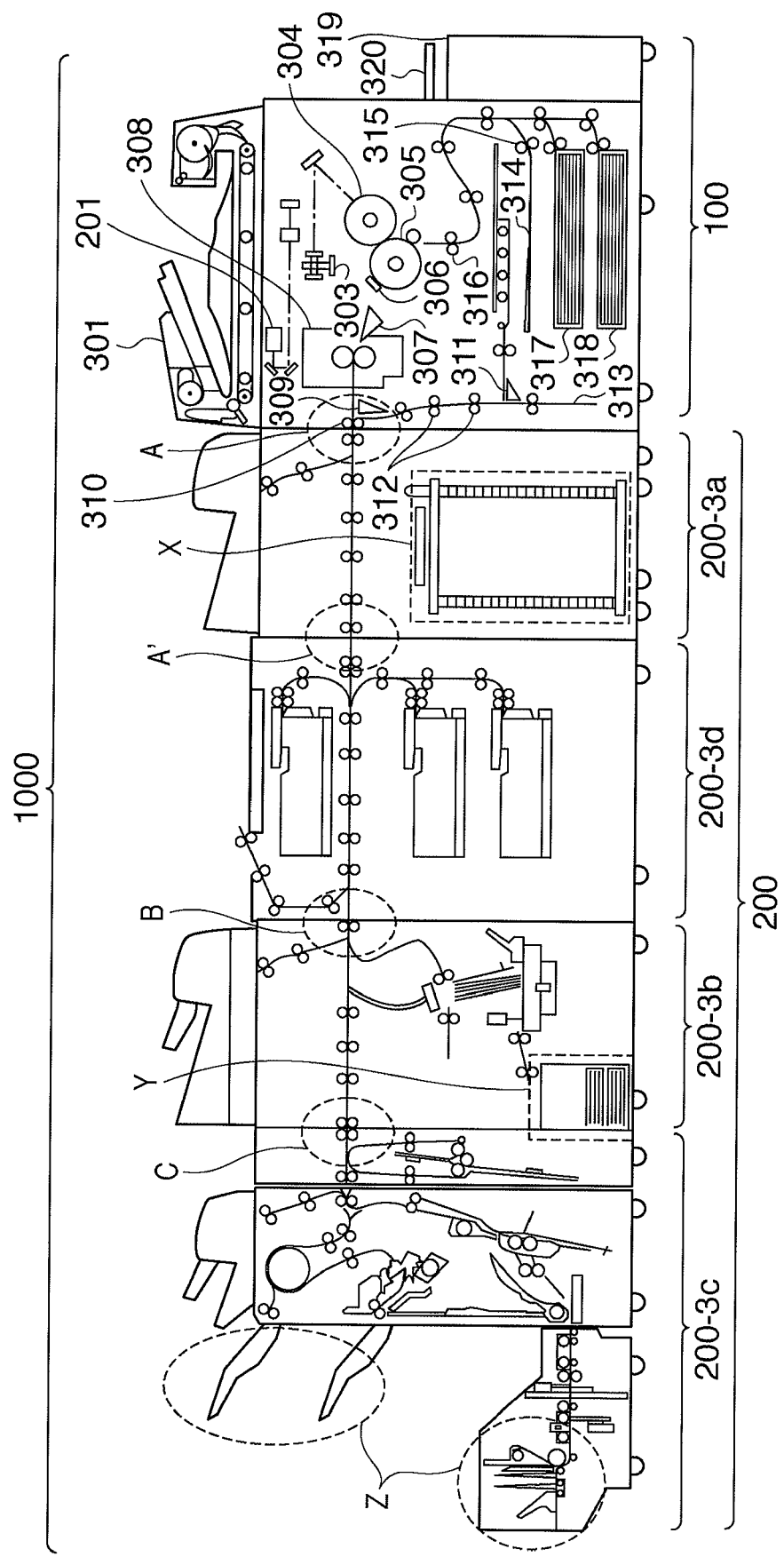
FIG. 3 depicts a schematic cross-sectional view illustrating a configuration of the printing system according to the embodiment.

FIG. 3 depicts a schematic cross-sectional view illustrating a configuration of the printing system 1000 according to this embodiment.

An automatic document feeder (ADF) 301 feeds a bundle of originals set on the loading side of an original tray one page at a time from the first page of the originals in order of page, onto a platen glass so that the originals are scanned by the scanner 201. The scanner 201 reads an image on an original fed on the platen glass using a CCD and converts the image into image data. A polygonal mirror 303 receives an incident light beam, such as laser light or the like, that is modulated, depending on image data, and emits it as reflected scanning light via a reflection mirror toward a photosensitive drum 304. A latent image formed on the photosensitive drum 304 by the laser light is developed by a toner, and a resultant toner image is transferred onto a sheet attached to a transfer drum 305. This image forming process sequence is successively executed for yellow (Y), magenta (M), cyan (C) and black (K) toners, thereby forming a full-color image. After the image forming process is executed four times, the sheet on the transfer drum 305 on which the full-color image is formed is separated by a separation pawl 306, and is then fed to a fixing unit 308 by a pre-fixing feeder 307. The fixing unit 308 includes a combination of rollers and a belt, and a heat source, such as a halogen heater or the like. By the fixing unit 308, a toner on a sheet on which a toner image has been transferred is melted and fixed by heat and pressure. A discharge flapper 309 is configured to be rotatable about a rotation shaft and define a feed direction of a sheet on which an image has been transferred. When the discharge flapper 309 is rotating in a clockwise direction in FIG. 3, a sheet is fed straightly and is then discharged out of the printing apparatus 100 by the rotation of discharge rollers 310. The controller 205 performs the above-described sequence to control the printing apparatus 100 so that one side of a sheet is printed.

On the other hand, when an image is formed on both sides of a sheet, the discharge flapper 309 is rotated in a counter-clockwise direction in FIG. 3, so that a sheet on which an image has been transferred is turned in a different direction, that is, downward, into a two-sided feed unit. The two-sided feed unit comprises a reversing flapper 311, a reversing roller 312, a reversing guide 313 and a duplex tray 314. The reversing flapper 311 rotates about a shaft and defines a feed direction of a sheet. The controller 205, when executing a two-sided printing job, performs control such that the reversing flapper 311 rotates in a counter-clockwise direction in FIG. 3, thereby sending a sheet whose first side has been printed by the printer unit 203, via the reversing rollers 312 to the reversing guide 313. Thereafter, the reversing rollers 312 are temporarily stopped while a trailing edge of the sheet is sandwiched by the reversing rollers 312. Thereafter, the reversing flapper 311 is rotated in a clockwise direction in FIG. 3 to rotate the reversing rollers 312 in opposite directions. Thereby, the sheet is fed in a switchback manner, so that the sheet is guided into the duplex tray 314 while the trailing edge and the leading edge of the sheet change their places. The sheet is temporarily loaded in the duplex tray 314 before being sent into registration rollers 316 by re-feeding rollers 315. In this case, the sheet is sent with the side opposite to the first side of the previous transferring step, facing the photosensitive drum 304. Thereafter, an image for the second side is formed on the second side of the sheet by a process that is similar to that described above. Thus, images have been formed on both sides of the sheet. After a fixing step, the sheet is discharged via the discharge rollers 310 from the inside to the outside of the printing apparatus 100. The controller 205 controls the printing apparatus 100 by a sequence as described above so that the printing apparatus 100 executes two-sided printing.

The printing apparatus 100 also has paper feed units for accommodating sheets required for a printing process. The paper feed units include paper feed trays 317 and 318 (for example, 500 sheets can be accommodated in each tray), a paper feed deck 319 (for example, 5000 sheets can be accommodated), a manual feed tray 320, and the like. Various types of sheets having different sizes or materials can be set in the paper feed trays 317 and 318 and the paper feed deck 319 (for example, the sheet size or material varies from paper feed unit to paper feed unit). Various types of sheets including special sheets, such as an OHP sheet and the like, can be set in the manual feed tray 320. The paper feed trays 317 and 318, the paper feed deck 319, and the manual feed tray 320 are each provided with paper feed rollers. Sheets are continuously fed and sent on a sheet-by-sheet basis by the paper feed rollers.

Next, the sheet processing apparatus 200 will be described.

In the printing system 1000 according to this embodiment, any types of and any number of sheet processing apparatuses 200 can be linked if a sheet can be fed from an upstream apparatus to a downstream apparatus via a sheet feeding path. For example, as shown in FIG. 3, a large-volume stacker 200-3a, an inserter 200-3d, a case binding device 200-3b, and a saddle stitching device 200-3c are successively linked in the stated order (the large-volume stacker 200-3a is closest to the printing apparatus 100). These can be selectively used in the printing system 1000. The sheet processing apparatuses 200 each comprise a sheet discharge unit. The user can remove a sheet that has been subjected to a sheet process from the sheet discharge unit of each sheet processing apparatus.

The controller 205 receives, via the console unit 204, a request for execution of a sheet process desired by the user of sheet process candidates that can be executed by the sheet processing apparatuses 200 connected to the printing apparatus 100, along with a request for execution of printing. The controller 205, when receiving via the console unit 204 a printing execution request of a job to be processed from the user, causes the printer unit 203 to execute a printing process requested by the job. Thereafter, the controller 205 feeds a sheet that has been subjected to the printing process in the job, via a sheet feeding path to a sheet processing apparatus that can execute a sheet process desired by the user, and causes the sheet processing apparatus to execute the sheet process.

For example, it is assumed that when the printing system 1000 has the system configuration of FIG. 3, a job to be processed for which an execution request has been received from the user is a large-volume stacking process that is performed by the large-volume stacker 200-3a. This job is referred to as a "stacker job". When the stacker job is processed by the system configuration of FIG. 3, the controller 205 causes sheets that have been printed by the printing apparatus 100 to pass through point A of FIG. 3 and enter the large-volume stacker 200-3a. Thereafter, the controller 205 causes the large-volume stacker 200-3a to execute the stacking process in this job. Thereafter, the controller 205 causes printed materials of this job that have been subjected to the stacking process by the large-volume stacker 200-3a to be held in a discharge destination X inside the large-volume stacker 200-3a without feeding the printed materials to other apparatuses (for example, the following apparatus).

The user can remove the printed materials of the stacker job held by the discharge destination X of FIG. 3, directly from the discharge destination X. Thereby, not all of the apparatuses connected in series have to perform operations, that is, it is not necessary to feed printed sheets to a discharge destination Z that is located at the most downstream position in the sheet feed direction of FIG. 3, and remove the printed materials from the final discharge destination Z.

In the system configuration of FIG. 3, it is also assumed that a job to be processed for which a job execution request has been received from the user is a sheet process that is performed by the case binding device 200-3b (e.g., a glue binding process that is any of a case binding process and a pad binding process. This job is referred to as a "glue binding job". When the glue binding job is processed by the system of FIG. 3, the controller 205 feeds sheets that have been printed by the printing apparatus 100, via points A, A' and B of FIG. 3, to the case binding device 200-3b. Thereafter, the controller 205 causes the case binding device 200-3b to execute the glue binding process in this job. Thereafter, the controller 205 causes printed materials of this job that have been subjected to the glue case binding process by the case binding device 200-3b, to be held by a discharge destination Y inside the case binding device 200-3b without feeding the printed materials to other apparatuses (for example, the following bookbinding device 200-3c).

Moreover, for example, in the system configuration of FIG. 3, it is assumed that a job to be processed for which a printing execution request has been received from the user is a sheet process that is performed by the saddle stitching device 200-3c. Examples of the sheet process of the saddle stitching device 200-3c include a saddle stitching process, a punching process, a trimming process, a shift discharging process, a folding process and the like. Here, this job is referred to as a "saddle stitching job". When the saddle stitching job is processed in the system configuration of FIG. 3, the controller 205 causes sheets that have been printed by the printing apparatus 100 to pass through points A, A', B and C and enter the saddle stitching device 200-3c. Thereafter, the controller 205 causes the saddle stitching device 200-3c to execute the sheet process in this job with respect to the printed sheets. Thereafter, the controller 205 causes the printed materials of the saddle stitching job that have been subjected to the sheet process by the saddle stitching device 200-3c, to be held in the discharge destination Z of the saddle stitching device 200-3c.

Note that there are a plurality of candidates for the discharge destination Z. The saddle stitching device 200-3c can execute a plurality of types of sheet processes, which have respective individual discharge destinations.

Moreover, for example, in the system configuration of FIG. 3, it is assumed that a job to be processed for which a printing execution request has been received from the user is a sheet process by the inserter 200-3d. This job is referred to as an "inserter paper feed job". In the inserter paper feed job, a sheet processing apparatus connected downstream can also be used. A case where the inserter paper feed job is processed in the system configuration of FIG. 3 will be described. In this case, the controller 205 inserts a sheet fed by the inserter 200-3d into sheets printed by the printing apparatus 100. Thereafter, these sheets are fed to the sheet processing apparatus in accordance with the designated sheet process, and are then subjected to the sheet process. In FIG. 3, since the case binding device 200-3b and the saddle stitching device 200-3c are connected downstream of the inserter 200-3d, the above-described glue binding job and saddle stitching job can be processed. Also, in the inserter paper feed job, printing by the printing apparatus 100 is not essential. Specifically, only sheets fed from the inserter 200-3d can be fed downstream, and a sheet process can be performed using a designated sheet processing apparatus.

As described with reference to FIGS. 1 to 3, in the printing system 1000 of this embodiment, a plurality of sheet processing apparatuses can be connected to the printing apparatus 100. Any combination of these sheet processing apparatuses can be connected to the printing apparatus 100. Also, the order in which these sheet processing apparatuses are connected can be freely changed as long as sheet feeding paths of these apparatuses can be connected to each other. Also, there are a plurality of types of candidates for a sheet processing apparatus that can be connected to the printing apparatus 100.

Figure 4:
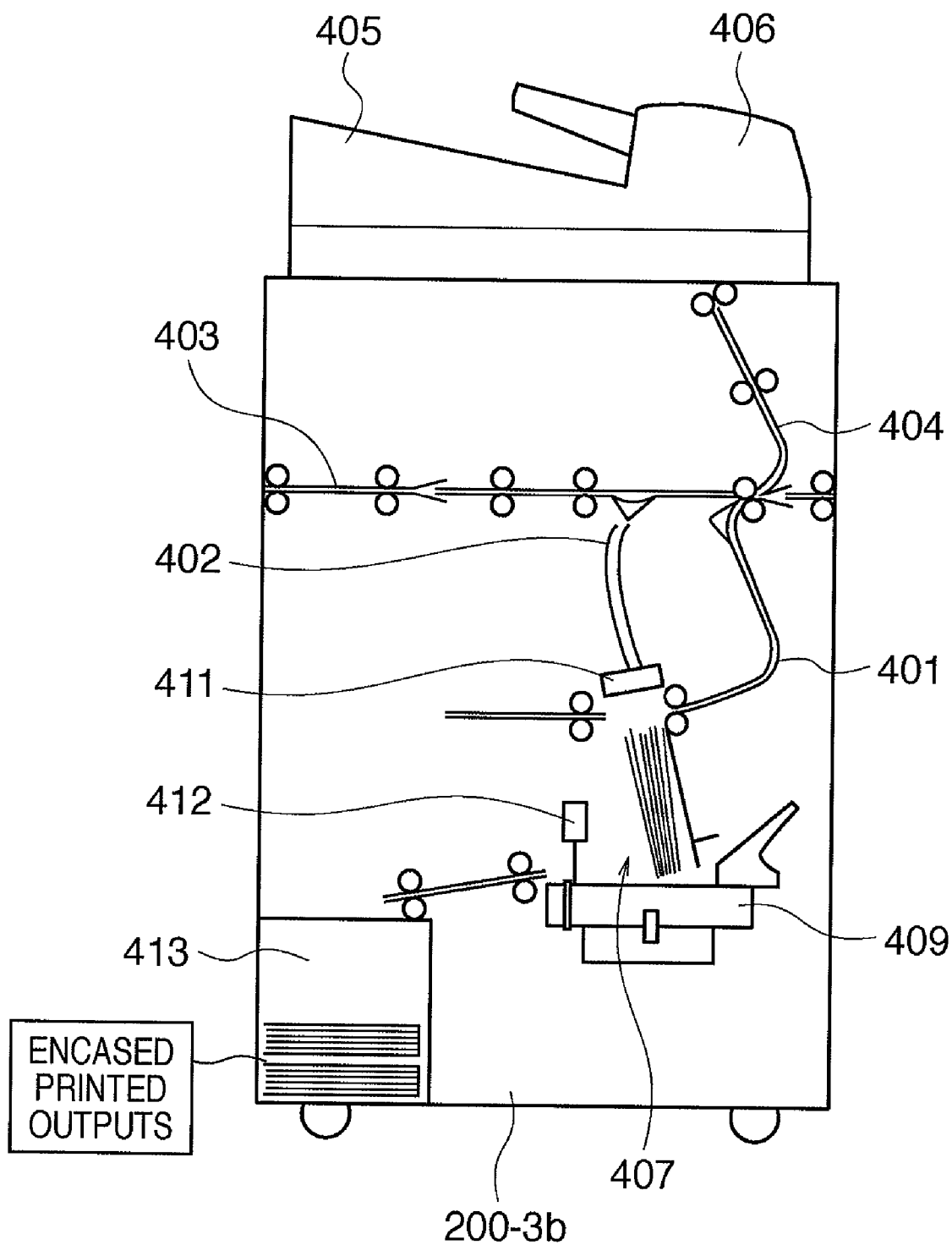
FIG. 4 depicts a cross-sectional view illustrating a configuration of a case binding device that is a sheet processing apparatus according to the embodiment.

FIG. 4 depicts a cross-sectional view illustrating a configuration of the case binding device 200-3b that is a sheet processing apparatus 200 according to this embodiment.

The case binding device 200-3b selectively feeds a sheet fed from an upstream device (inserter 200-3d) to three feed paths. The three feed paths are a cover path 401, a body path 402, and a straight path 403. The case binding device 200-3b also has an inserter path 404. The inserter path 404 is a sheet feeding path for feeding a sheet placed on an inserter tray 405 to the cover path 401. The straight path 403 is a sheet feeding path for feeding a sheet to the following device in a job that does not require the glue binding process by the case binding device 200-3b. The body path 402 and the cover path 401 are sheet feeding paths for feeding a sheet that is required so as to create a case binding printed material.

For example, when the case binding device 200-3b is used to create a case binding printed material, the controller 205 of the printing apparatus 100 causes the printer unit 203 to print image data of a body text onto sheets for a body text of a case binding printed material. In case binding, a bundle of sheets for a body text (corresponding to a book) is wrapped in a cover sheet. A bundle of sheets in case binding for a body text is referred to as a "body".

The controller 205 also performs control such that sheets printed by the printing apparatus 100 that are to become a body are fed to the body path 402. The controller 205, when performing a case binding process, executes a process of encasing the body printed by the printing apparatus 100 in a cover sheet that is fed via the cover path 401. For example, the controller 205 stacks sheets to become a body that are fed from an upstream device successively in the body path 402. When a body of sheets having body text data printed thereon, the number of which corresponds to one book, have been stacked in a stack unit 407, the controller 205 feeds a cover sheet required for the job via the cover path 401. The controller 205 controls an adhesion unit 411 so that an adhesion process is performed with respect to a spine portion of a sheet bundle corresponding to the body. Thereafter, the controller 205 performs control such that the spine portion of the body and a middle portion of the cover are adhered together using the adhesion unit 411. When the body is joined with the cover, the body is fed to be tucked into a lower portion of the device. Thereby, a process of folding the cover is performed so that the body is encased in the cover. Thereafter, the sheet bundle corresponding to a book that is thus wrapped in the cover is loaded on a turn table 409 along a guide. After the sheet bundle is set on the turn table 409, the controller 205 causes a cutter 412 to execute a process of trimming the sheet bundle. Here, the cutter 412 can execute a three-way cutting process of trimming three edge portions of the sheet bundle other than an edge portion corresponding to the spine portion thereof. Thereafter, the controller 205 causes a shifting unit to push out the sheet bundle that has been subjected to the three-way cutting process toward a basket 413, so that the sheet bundle is accommodated in the basket 413.

The case binding device 200-3b not only processes sheets fed from an upstream device, but also performs a case binding process or a pad binding process on its own. For example, a case where the case binding device 200-3b is used singly to perform a case binding process, will be described. Initially, the operator sets sheets to be processed in the inserter tray 405. Thereafter, the controller 205 causes an inserter 406 to feed sheets to become a body set in the inserter tray 405. Next, the controller 205 performs a control so that the sheets to become a body are fed to the body path 402. Thereafter, the controller 205 feeds via the cover path 401 a cover sheet similarly fed from the inserter tray 405, and executes a process of encasing the sheets to become a body. The subsequent processes are similar to those described above.

Figure 5:
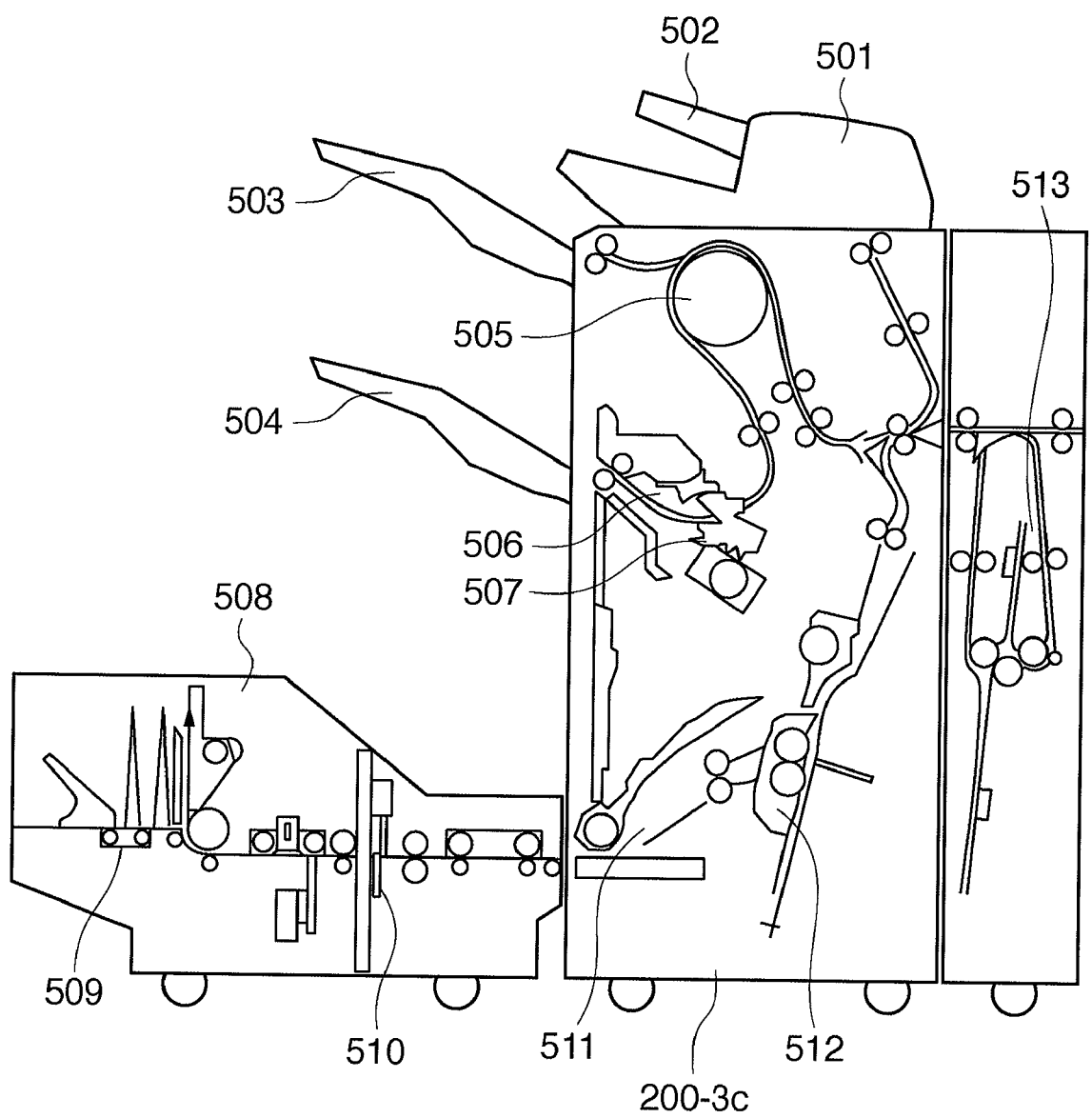
FIG. 5 depicts a cross-sectional view illustrating a configuration of a saddle stitching device that is a sheet processing apparatus according to the embodiment.

FIG. 5 depicts a cross-sectional view illustrating a configuration of the saddle stitching device 200-3c that is a sheet processing apparatus 200 according to the embodiment.

The saddle stitching device 200-3c comprises various types of units that selectively execute a stapling process, a trimming process, a punching process, a Z-folding process, a shift discharging process, a saddle stitching process and the like with respect to sheets from the printing apparatus 100. The saddle stitching device 200-3c does not have a straight path that has a function of feeding a sheet to the following device. Therefore, when a plurality of sheet processing apparatuses are connected to the printing apparatus 100, the saddle stitching device 200-3c must be provided at the tail end of the line of the apparatuses as shown in FIG. 3.

The saddle stitching device 200-3c also has a sampling tray 503 and a stacking tray 504 outside the device, and a booklet tray 511 inside the device. The controller 205, when receiving an instruction to perform stapling in the saddle stitching device 200-3c, stacks sheets printed by the printing apparatus 100 on an internal processing tray 506 inside the saddle stitching device 200-3c. When a bundle of sheets is thus stacked on the process tray 506, the controller 205 causes a stapler 507 to perform stapling. Thereafter, the controller 205 causes the stapled sheet bundle to be discharged from the process tray 506 onto the stacking tray 504.

Also, the controller 205, when a Z-folding job is executed in the saddle stitching device 200-3c, causes a Z-folding unit 513 to execute a process of folding a sheet printed by the printing apparatus 100 into a Z-shape. Thereafter, the controller 205 performs control such that the Z-folded sheet is passed through the saddle stitching device 200-3c and is then discharged onto a discharging tray, such as the stacking tray 504, the sampling tray 503 or the like. Also, the controller 205, when receiving a job of executing a punching process in the saddle stitching device 200-3c, causes a puncher unit 505 to execute a punching process with respect to a sheet printed by the printing apparatus 100. Thereafter, the controller 205 performs control such that a bundle of sheets that have been subjected to the punching process is passed through the saddle stitching device 200-3c and is then discharged onto a discharging tray, such as the stacking tray 504, the sampling tray 503 or the like.

Also, the controller 205, when executing a job of executing a saddle stitching process in the saddle stitching device 200-3c, causes a saddle stitcher unit 512 to perform two-portion stitching at a middle portion of a bundle of sheets. Thereafter, the controller 205 causes the middle portion of the sheet bundle to be sandwiched by rollers so that the sheet bundle is folded in half along the middle portion. Thereby, a booklet, such as a pamphlet, can be created. A sheet bundle that has been thus subjected to the saddle stitching process by the saddle stitcher unit 512 is fed to the booklet tray 511.

Also, the controller 205, when receiving an instruction to perform a trimming process with respect to the job of performing a saddle stitching process, feeds the saddle-stitched sheet bundle from the booklet tray 511 to a trimmer 508. Thereafter, the controller 205 causes a cutter 510 to trim the sheet bundle fed to the trimmer 508, and causes a booklet holding unit 509 to hold the sheet bundle. The saddle stitching device 200-3c is also configured to execute three-way cutting with respect to the saddle-stitched sheet bundle.

Note that when the saddle stitching device 200-3c is not provided with the trimmer 508, a sheet bundle bound by the saddle stitcher unit 512 can be removed from the booklet tray 511. The saddle stitching device 200-3c is also configured to attach a sheet (e.g., a pre-printed cover sheet) set in an insert tray 502 to sheets fed from the printing apparatus 100 (printed by the printing apparatus 100).

Moreover, the saddle stitching device 200-3c not only processes sheets fed from an upstream device, but also performs a stapling process, a trimming process, a punching process, a Z-folding process, a shift discharging process, a saddle stitching process and the like on its own. Note that the saddle stitching device 200-3c is configured without a path via which a sheet fed using an inserter 501 is fed to the Z-folding unit 513. Therefore, a Z-folding process cannot be achieved by the saddle stitching device 200-3c alone. However, the saddle stitching device 200-3c is configured to be able to feed a sheet fed from an upstream device to the Z-folding unit 513. Therefore, a sheet can be fed using an inserter or the like provided in a sheet processing apparatus connected upstream, and the fed sheet can be subjected to a sheet process by the Z-folding unit 513. Therefore, the saddle stitching device 200-3c is configured to be able to execute only a sheet process without using the printing apparatus 100.

Figure 6:
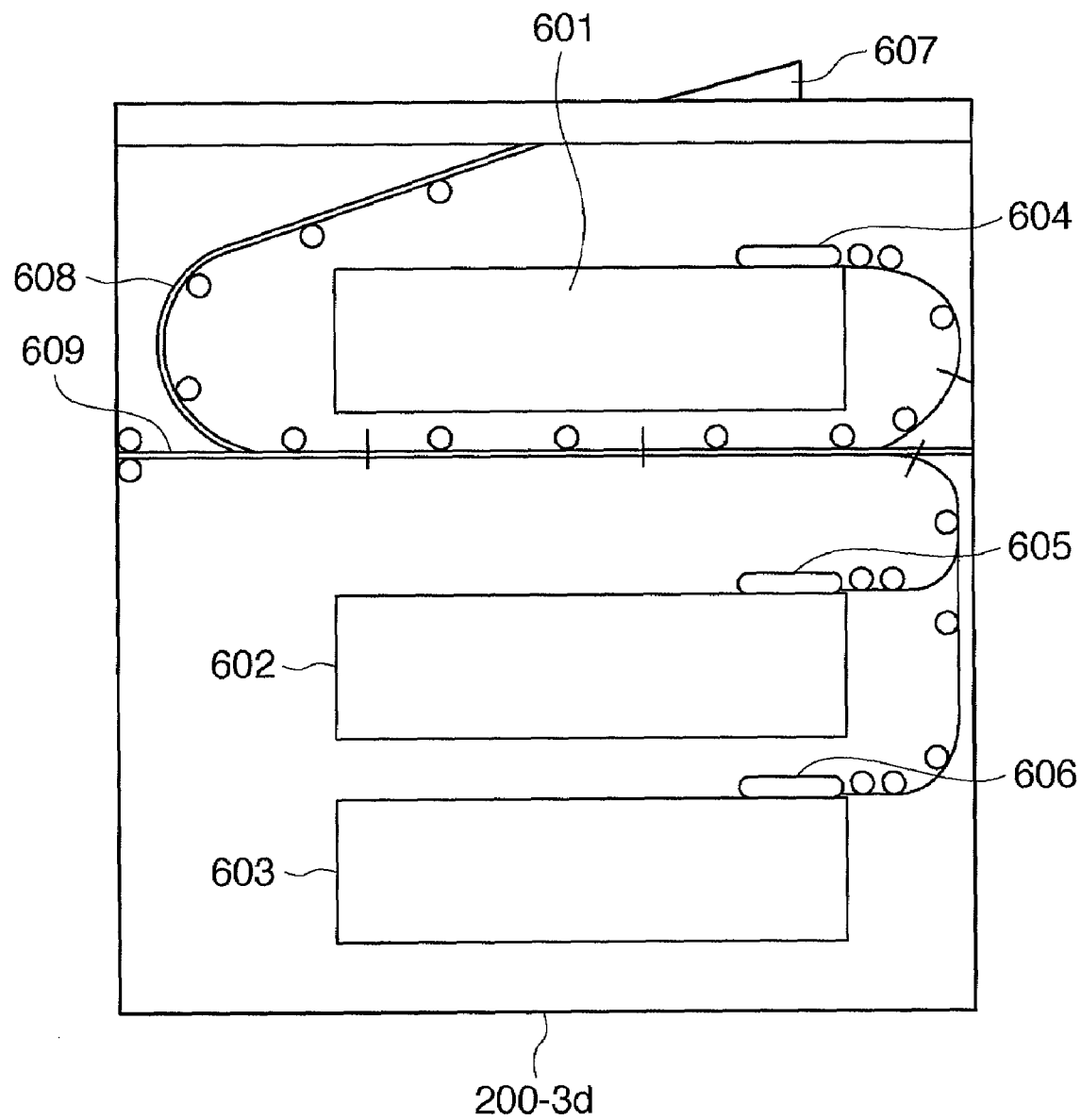
FIG. 6 depicts a cross-sectional view illustrating a configuration of a large-volume inserter that is a sheet processing apparatus according to the embodiment.

FIG. 6 depicts a cross-sectional view illustrating a configuration of the large-volume inserter 200-3*d* that is a sheet processing apparatus 200 according to the embodiment.

The large-volume inserter 200-3*d* feeds a sheet fed from an upstream device to a downstream device via a straight path 609. The large-volume inserter 200-3*d* also feeds sheets set in paper feed decks 601, 602 and 603 via the straight path 609 to a downstream device using paper feed motors 604 to 606, respectively. An escape path 608 is a sheet feeding path for discharging a sheet to an escape tray 607. These are sheet feeding paths for feeding double-fed sheets to the escape tray 607 when double feeding is detected during paper feeding. Note that a plurality of sheet detecting sensors for detecting a fed state or a jammed state of a sheet are provided in sheet feeding paths inside the large-volume inserter 200-3*d*.

The large-volume inserter 200-3*d* comprises a CPU (not shown) that sends sheet detection information from these sensors to the controller 205 via signal lines for data communication. Based on the information sent from the large-volume inserter 200-3*d*, the controller 205 recognizes the fed state or jammed state of a sheet inside the large-volume inserter 200-3*d*. Note that when another sheet processing apparatus is connected between the large-volume inserter 200-3*d* and the printing apparatus 100, a CPU (not shown) included in the sheet processing apparatus sends information of the sensors of the large-volume inserter 200-3*d* to the controller 205.

Figure 7:
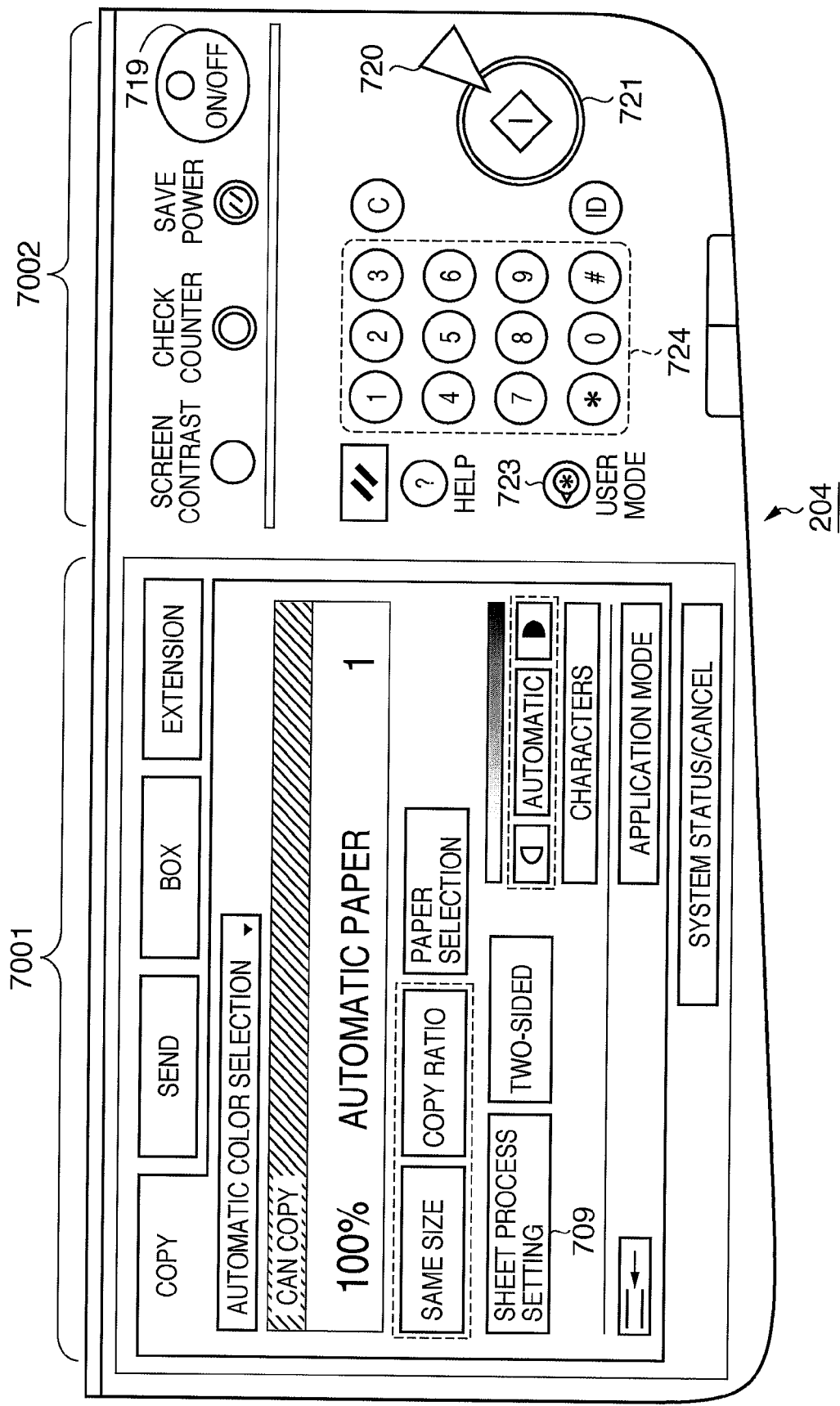
FIG. 7 is a diagram for describing a display unit and a key arrangement of a console unit of the printing apparatus according to the embodiment.

FIG. 7 is a diagram for describing a display unit and a key arrangement of the console unit 204 of the printing apparatus 100 according to the embodiment.

The console unit 204 comprises the touch panel unit 7001 and the key input unit 7002. The touch panel unit 7001, which comprises a liquid crystal display unit (LCD) and a transparent electrode adhered thereonto, displays various setting screens for receiving instructions from the user. The touch panel unit 7001 has a function of displaying various screens and a function of receiving instructions from the user. The key input unit 7002 comprises a power key 719, a start key 721, a stop key 720, a user mode key 723, a numeric keypad 724 and the like. The start key 721 is used to cause the printing apparatus 100 to start execution of a copying job, a transmission job or the like. The numeric keypad 724 is used to input numerical settings, such as the number of copies and the like.

The controller 205 controls the printing system 1000 so that the system 1000 performs various processes in accordance with instructions from the user that are received via various screens displayed on the touch panel unit 7001 or via the key input units 7002.

FIG. 8 is a diagram showing an exemplary setting screen that is displayed on the touch panel unit 7001 so as to cause the user to select the type of a sheet process to be executed with respect to sheets printed by the printing apparatus 100 of this embodiment.

In the example of FIG. 8, a plurality of items for selecting sheet process types are shown.

When the user presses a sheet process setting button 709 for setting a sheet process on a screen (FIG. 7) displayed on the touch panel unit 7001, the controller 205 of the printing apparatus 100 causes the touch panel unit 7001 to show the screen of FIG. 8. The screen of FIG. 8 is a setting screen that is configured to enable the user to select types of sheet processes that can be executed using the sheet processing apparatuses 200 included in the printing system 1000. The controller 205 receives, via the screen of FIG. 8, a setting of a sheet process to be executed in a job to be processed, and causes a corresponding sheet processing apparatus 200 to execute a sheet process in accordance with the setting.

Note that in a case that the sheet processing apparatuses 200 are connected to the printing apparatus 100, a configuration is possible in which the operator can register information that specifies the types and the number of sheet processing apparatuses and the order in which the sheet processing apparatuses are connected, for example.

For example, a case where the printing system 1000 has a system configuration as shown in FIG. 3 will be described. In this case, registered information is set that indicates that four sheet processing apparatuses (that is, the large-volume stacker 200-3*a*, the inserter 200-3*d*, the case binding device 200-3*b*, and the saddle stitching device 200-3*c*) are sequentially connected to the printing apparatus 100 where the large-volume stacker 200-3*a* is closest to the printing apparatus 100. The controller 205 holds, in the RAM 208, information about the sheet processing apparatuses 200 that has been set by the operator, as system configuration information, and reads out and references the information as required. Thereby, the controller 205 confirms what types of and how many sheet processing apparatuses are connected to the printing apparatus 100 and in what order the sheet processing apparatuses are arranged, for example.

For example, it is now assumed that the user connects the saddle stitching device 200-3*c*, which does not have a straight path, in between a plurality of sheet processing apparatuses. In this case, the controller 205 causes the touch panel unit 7001 to display an error display indicating that the setting is invalid. In this case, the controller 205 may also cause the touch panel unit 7001 to display guidance information that prompts the operator to connect the saddle stitching device 200-3*c*, which does not have a straight path, at the tail end of the line of the sheet processing apparatuses.

In this embodiment, the console unit 204 included in the printing apparatus 100 is used as an exemplary user interface that is applied to the printing system 1000. The present invention is not limited to this. For example, in the printing system 1000, a process may be executed in accordance with an instruction from a user interface unit provided in an external apparatus, such as the PC 103, the PC 104 or the like. Thus, in a case that the printing system 1000 is remotely operated from an external apparatus, a setting screen about the printing system 1000 is displayed on a display unit of the external apparatus.

Next, a case where the PC 104 is used as a user interface will be described.

A CPU included in the PC 104, when receiving a printing request from the user, causes a display to display a setting screen, via which settings for printing process conditions are received by the operator of the PC 104. When receiving a printing execution request from the operator, the CPU included in the PC 104 associates the printing process conditions received via the screen with image data to be printed. The CPU also controls the printing system 1000 so that the printing process conditions are transmitted as a job via the network 101.

On the other hand, in the printing system 1000, the controller 205 of the printing apparatus 100 receives the printing execution request of the job via the external I/F 202. Thereafter, the controller 205 controls the printing system 1000 so that the job from the PC 104 is processed based on the printing process conditions from the PC 104. Thus, various types of units can be provided as user interfaces in the printing system 1000.

Next, various controls that are executed by the controller 205 that is an exemplary controller of this embodiment for the printing system 1000 will be hereinafter described. Note that the printing apparatus 100 of the printing system 1000 has the printer unit 203 that can execute a process of printing data in the HDD 209 that can store data of a plurality of jobs. Also, the printing system 1000 is configured so that a plurality of sheet processing apparatuses 200 can be connected to the printing apparatus 100. Also, these sheet processing apparatuses 200 that can be connected to the printing apparatus 100 are configured so that sheet processes (also referred to as finishing or post-processes) can be executed with respect to sheets (also referred to as printed materials or printing media) that have been subjected to a printing job performed by the printer unit 203. The sheet processing apparatuses 200 are also configured so that printed materials can be removed from each individual apparatus by the operator after the printed materials are subjected to a sheet process in the apparatus. The sheet processing apparatuses 200 are also configured so that the inserter 200-3d that is one of the sheet processing apparatuses 200 can selectively supply a sheet set in a paper feed deck of the inserter 200-3d to a plurality of sheet processing apparatuses 200. The printing system 1000 of this embodiment is also configured so that the printer unit 203 can selectively supply sheets that have been subjected to a printing job by the printer unit 203 to the sheet processing apparatuses 200.

The printing system 1000 also has a function of processing a job using only the sheet processing apparatuses 200 without using the printing apparatus 100. The controller 205 can selectively execute a process that is performed by using only the sheet processing apparatuses 200 and a process that is performed by using the printing apparatus 100, for each job to be processed, in accordance with an operator's instruction from a user interface unit (UI unit). The controller 205 can also control the printing system 1000 so that these two processes can be executed in combination in some cases.

In the printing system 1000 according to this embodiment, a post-process that is performed by a sheet processing apparatus connected to a printing apparatus (the printer unit 203 or the printing apparatus 100) can be used without being accompanied by printing by the printing apparatus. Thereby, a highly flexible and convenient system is provided. For example, the printing system 1000 according to the embodiment can receive a request for execution of a specific type of job in which a post-process is performed by a sheet processing apparatus connected to a printing apparatus without execution of printing by the printing apparatus. Note that this embodiment illustrates a configuration in which the printer unit 203 or the printing apparatus 100 executes a printing function, and a sheet processing apparatus 200 (for example, at least any of the finishers 200-3a to 200-3d) connected to the printing apparatus 100 executes a post-processing function.

This embodiment also illustrates, as the specific type of job, a job that requires a sheet process that is performed by a sheet processing apparatus 200 without being accompanied by printing by the printer unit 203 as described above (hereinafter the sheet process is referred to as a post-process). In this embodiment, a job that requires execution of a post-process by a sheet processing apparatus 200 independently of (asynchronously with/in non-association with) the printing process of the printing apparatus 100, is handled as the specific type of job. The controller 205 performs control such that the specific type of job can be processed by the printing system 1000. Note that examples of a post-process whose execution is permitted in the specific type of job in this embodiment include:

(1) a stapling process;
(2) a punching process;
(3) a trimming process;
(4) a saddle stitching process;
(5) a folding process;
(6) a case binding process;
(7) a pad binding process; and
(8) an insertion process.

In this embodiment, the post-processes (1) to (5) can be selectively executed by the saddle stitching device 200-3c of FIG. 5 (corresponding to the sheet processing apparatus 200-3c of FIG. 3). The post-processes (6) and (7) can be selectively executed by the case binding device 200-3b of FIG. 4 (corresponding to the sheet processing apparatus 200-3b of FIG. 3). The post-process (8) can be executed by the large-volume inserter 200-3d of FIG. 6 (corresponding to the sheet processing apparatus 200-3d of FIG. 3).

Also in this embodiment, as a post-process permitted without being accompanied by printing by the printing apparatus 100, the controller 205 performs control such that a plurality of selection candidates are displayed on a user interface. A specific exemplary screen is shown in FIG. 8.

Post-processes described above are only for illustrative purposes. Any types of post-processes may be employed as post-processes that can be executed without being accompanied by printing. Also, as in this embodiment, these various types of post-processes may be selectively not executed. For example, there may be only one type of post-process that can be executed without being accompanied by printing.

Also in this embodiment, various user interfaces that are provided by the printing system 1000 and are configured to be able to interactively respond to an operator's operation, may be provided. Examples of the user interfaces include the console unit 204 and/or a soft key or a hard key provided on the console unit 204, or the various user interface screens of FIGS. 7 and 8, and the like. Note that these are only for illustrative purposes and the present invention is not limited to these. For example, a request for execution of the specific type of job may be received from an external apparatus that is different from the printing system 1000. In this case, for example, a user interface that is provided in an external data generating source, such as the network scanner 102, the PC 103, the PC 104 or the like, has a function of receiving the execution request. Also, in this case, a unit, such as the external I/F 202 or the like, that is required so as to allow the printing system 1000 to receive such a specific type of job, has a function of receiving the execution request.

As described above, various modifications and applications can be made for this embodiment. The present invention is applicable to any apparatus and system that has at least a configuration illustrated below as in the printing system 1000 according to this embodiment. For example, it is assumed that the controller 205 has received a request for execution of the specific type of job via the user interface. In this case, in response to the execution request, the controller 205 performs control such that the sheet processing apparatus 200 executes a post-process with respect to printed materials (first printed materials) that has been previously created for the specific type of job, without execution of printing by the printing apparatus 100.

As described above, the printing system 1000 of this embodiment, when receiving the request for execution of the specific type of job, can cause the post-processing apparatus to execute a post-process with respect to the previously created first printed materials without execution of printing by a printing apparatus. It is assumed in this embodiment that such control is executed by the controller 205 of this embodiment.

Note that, in this embodiment, the sheet processing apparatus 200 itself comprises a predetermined sheet supply apparatus configured to be able to supply first printed materials, that is, a plurality of printing media previously printed (sheets: printed materials). Examples of the sheet supply apparatus include the large-volume stacker 200-3a, the saddle stitching device 200-3c, and the large-volume inserter 200-3d that are illustrated as the sheet processing apparatuses 200. These each have an inserter, paper feed decks 1 to 3 (601 to 603) and the like as shown in FIGS. 5 and 6. In this embodiment, these units not only execute the above-described functions, but also function as sheet supply apparatuses. The first printed materials required for the specific type of job are set into the sheet supply apparatus by the operator.

In this embodiment, the controller 205, when receiving a request for execution of the specific type of job from the operator, causes the first printed materials to be supplied from a sheet supply apparatus to a post-processing unit inside the sheet processing apparatus 200 without via the printing apparatus. Thereafter, the controller 205 causes the post-processing unit to execute a post-process with respect to the first printed materials. In such a manner, the controller 205 performs control such that a post-process designated by the user for the job can be executed by the sheet processing apparatus 200 without being accompanied by a printing process by the printing apparatus 100.

Note that in a case that the specific type of job described above is executed, the first printed materials that are used in the job may be supplied from a paper feed tray provided in the printing apparatus 100. In this case, the first printed materials are introduced from the printing apparatus 100 via an internal feed path inside the printing apparatus 100 to a sheet processing apparatus 200. In this case, the controller 205 performs control such that printing is not performed with respect to the first printed materials in the printing apparatus 100. Thereafter, when the printed materials are introduced into the sheet processing apparatus 200, the controller 205 performs control such that the printed materials are subjected to a post-process designated by the user.

(Flowchart of Job Separation)

Figure 9:
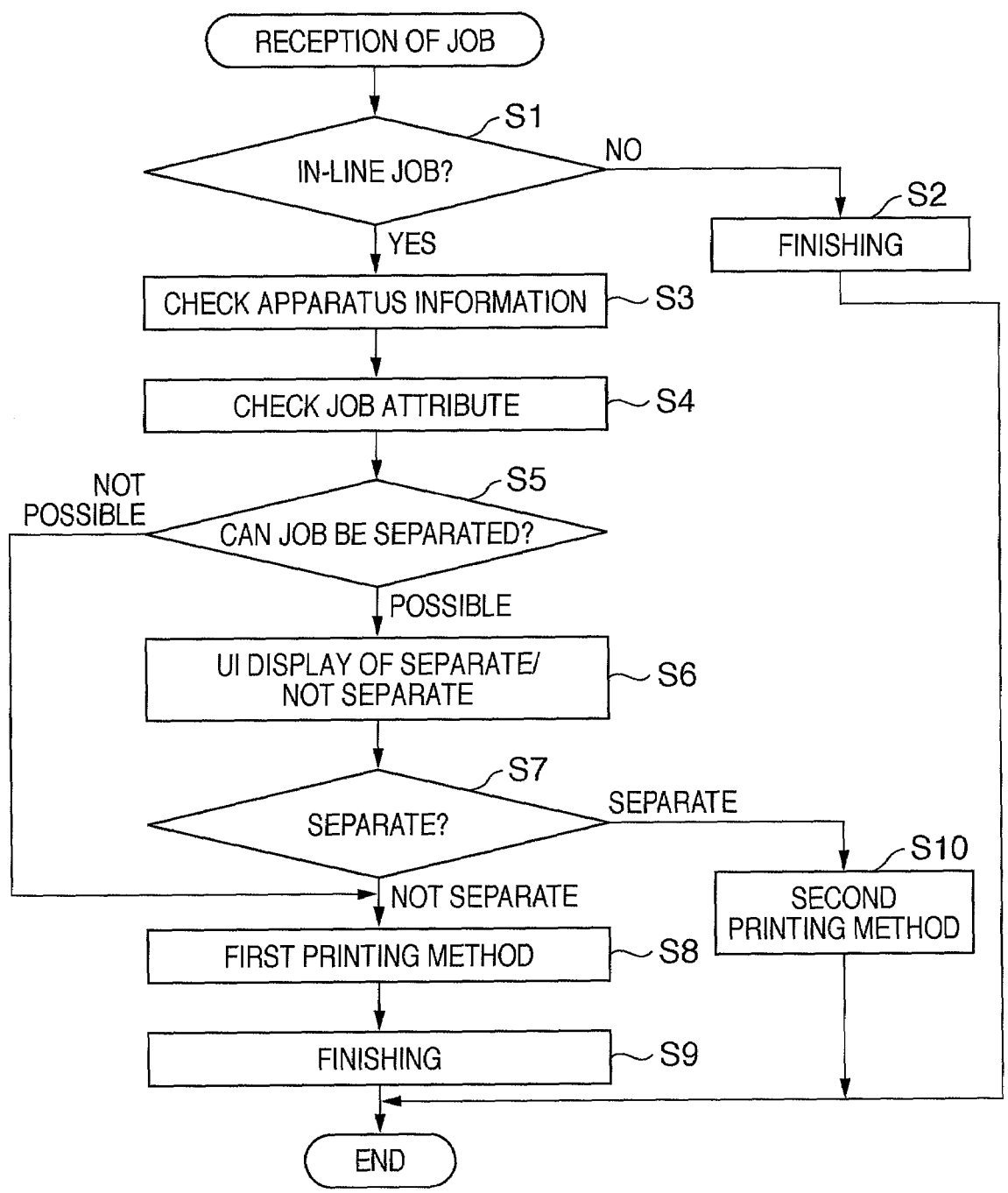
FIG. 9 is a flowchart explaining a process in the printing system according to the embodiment of the present invention.

FIG. 9 is a flowchart for describing a process in the printing system of the embodiment of the present invention. The flowchart shows a process that is performed by the printing system 1000 according to the embodiment when receiving a printing execution request from the user. Note that a program for executing the process is stored in the ROM 207, and is executed in a control of the CPU 205a of the controller 205.

The process is started when the printing system 1000 receives a printing execution request as a job. Initially, in step S1, the controller 205 determines whether or not the received job is an in-line job or an off-line job. Here, the in-line job refers to a job in which, after a printing process is performed by the printing apparatus 100, a post-process is executed by a sheet processing apparatus 200. The off-line job refers to a job in which printing is not performed by the printing apparatus 100, and only a post-process is executed with respect to a previously created printed material by a sheet processing apparatus 200.

When it is determined in step S1 that the job is not an in-line job, that is, the job is an off-line job, the process advances to step S2, in which a sheet processing apparatus 200 performs a finishing process corresponding to an attribute of the job, such as case binding, saddle stitching or the like.

On the other hand, when it is determined in step S1 that the job is an in-line job, the process advances to step S3, in which the controller 205 checks information about each apparatus included in the printing system 1000 (FIG. 3). Next, the process proceeds to step S4, in which a finishing attribute of the job is examined. Thereafter, the process proceeds to step S5, in which it is determined whether or not the job can be separated into a "printing-only job" and an "off-line job".

This determination is performed based on whether or not the finishing process of the job is included in the off-line jobs supported by the printing system 1000. Moreover, in the printing system 1000, a screen for adding another criterion for determining whether or not the separation is possible may be prepared.

When it is determined in step S5 that the job separation is not possible, the job is determined as a normal in-line job and the process advances to step S8. Here, after a printing process is executed by the printing apparatus 100, the process proceeds to step S9, and the resultant sheets are used to execute a post-processing by a sheet processing apparatus 200.

On the other hand, when it is determined in step S5 that the job separation is possible, the process advances to step S6, in which a screen for causing the user to select whether to actually separate the job is displayed on the touch panel unit 7001 of the console unit 204.

Figure 10:
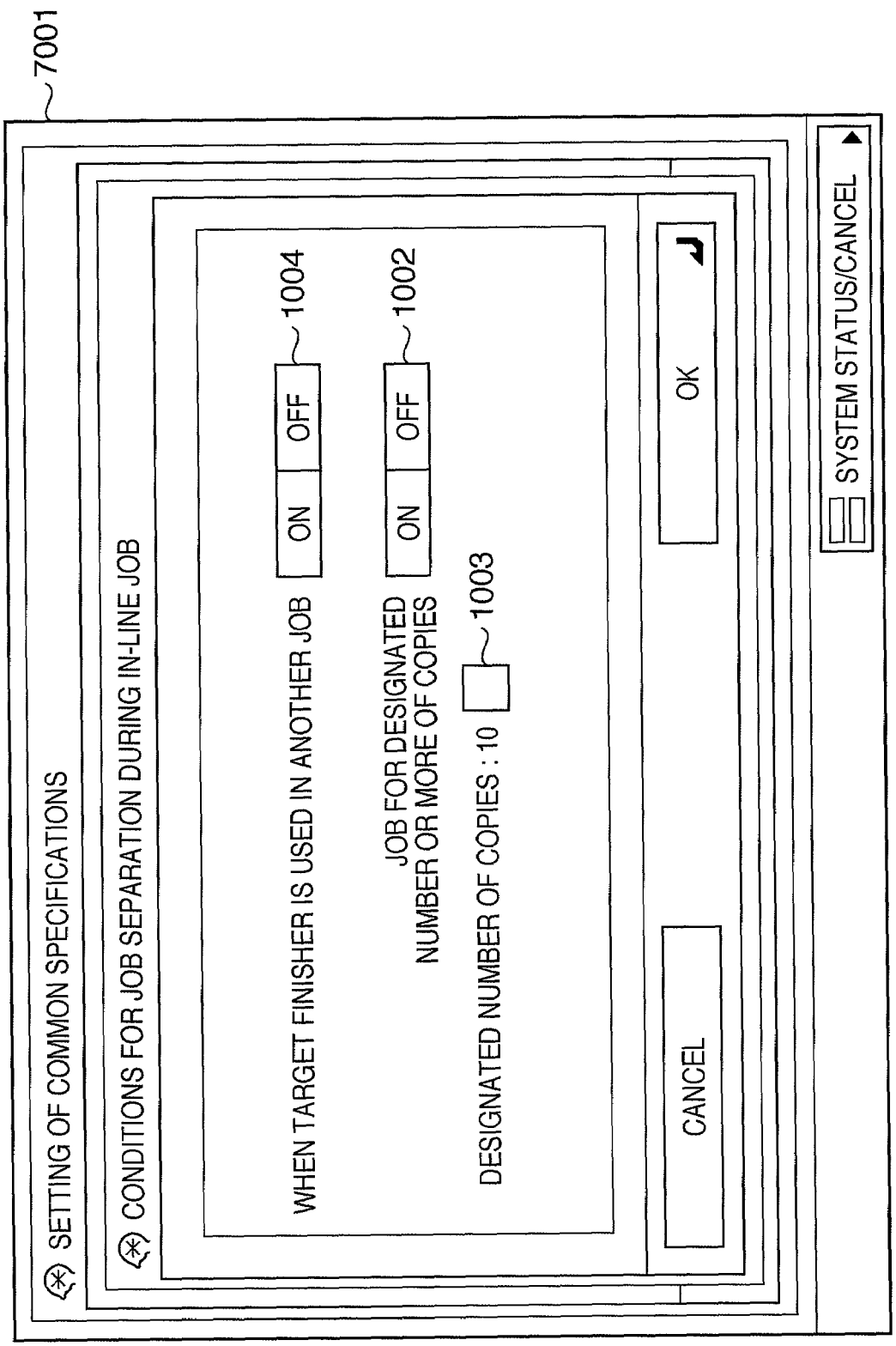
FIG. 10 is a diagram showing an exemplary screen for setting conditions for determining whether or not a job is to be separated, the screen being displayed on the touch panel unit of the console unit in the printing apparatus according to the embodiment.

FIG. 10 is a diagram showing an exemplary screen for setting conditions for determining whether or not the job is to be separated. The screen is displayed on the touch panel unit 7001 of the console unit 204 in the printing apparatus according to the embodiment.

In FIG. 10, a conditions setting button 1004 is a button for instructing job separation in a case where a finisher to be used for a target in-line job is occupied by another job. When the button 1004 is set to be "ON", then if the finisher to be used for the target in-line job is occupied by another job, it is determined that the job is to be separated. Also, when a setting button 1002 is set to be "ON", then if the target in-line job is a job of a designated number or more of copies, the job can be separated in unit of the designated number of copies. Also, the designated number of copies in this case can be set to be a desired value by a setting changing button 1003.

Figure 11:
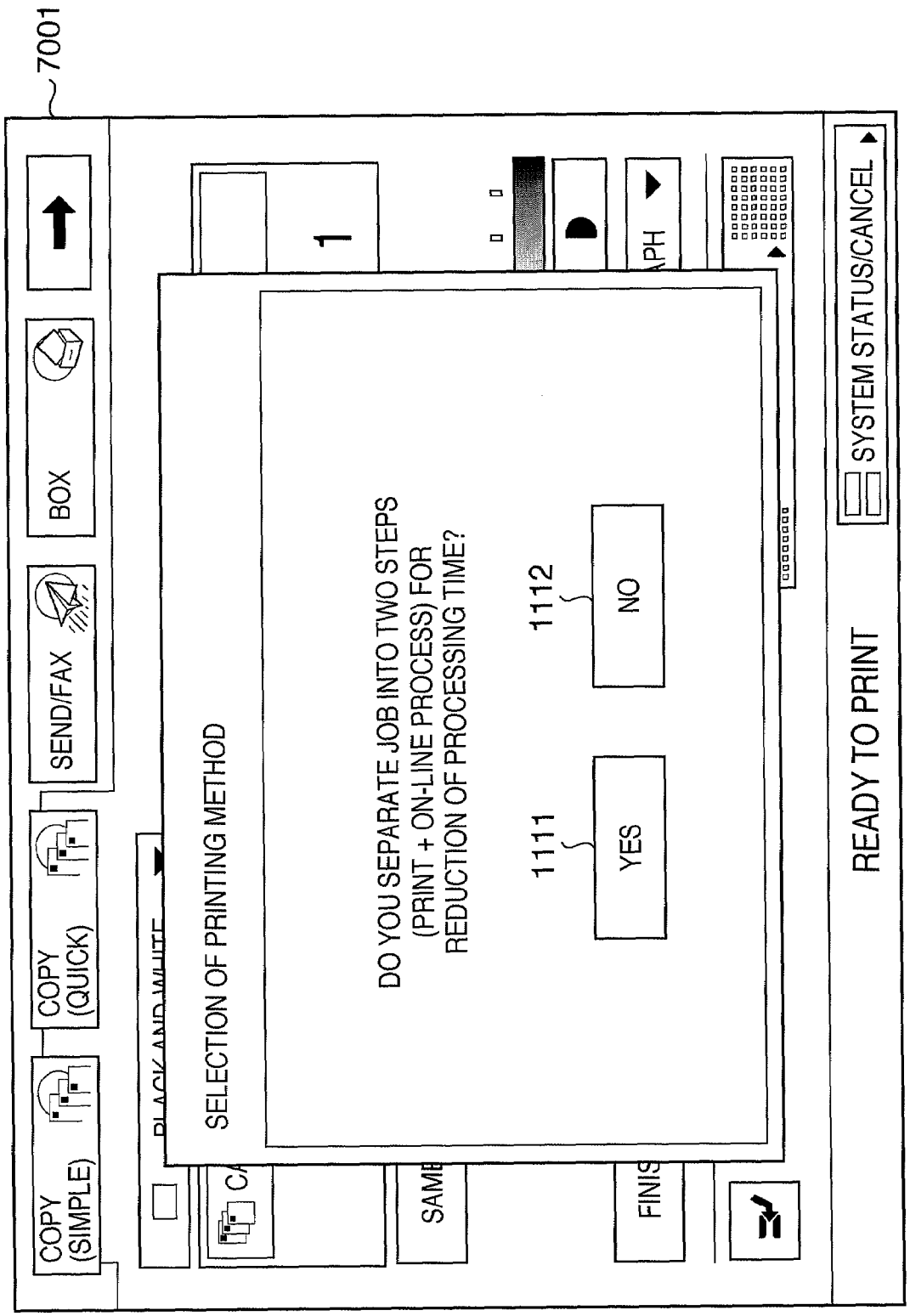
FIG. 11 is a diagram showing another exemplary screen for causing the user to select whether to separate a job.

FIG. 11 is a diagram showing another exemplary screen for causing the user to select whether or not to separate a job.

In FIG. 11, when the user presses down a button 1111 for instructing job separation, it is determined that the job is to be separated. When the user presses down a button 1112 for instruction not to perform job separation, it is determined the job is not to be separated.

Note that either of the separation conditions set using the screens of FIGS. 10 and 11 may be applied singly with priority. Alternatively, for example, it may be assumed that when it is determined in FIG. 11 that job separation is to be performed, then if conditions as shown in FIG. 10 are satisfied, a job is separated.

Thus, the process advances to step S7, in which it is determined whether or not job separation is to be performed. If it is determined that the job separation is not to be performed, the process advances from step S7 to step S8, in which the job is executed as a normal in-line job.

On the other hand, when it is determined in step S7 that the job separation is to be performed, the process advances from step S7 to step S10, only a printing process by the printing apparatus 100 is performed. The printing process of step S10 is different from a printing process of a normal in-line job and is a printing control process that takes execution of an off-line job into consideration. For example, when a plurality of copies of sheets for case binding are printed, printing of a cover and printing of a body are alternately executed in a normal printing process, which is repeatedly performed the number of times corresponding to the designated number of copies. However, in the printing process of step S10, for example, only covers the number of which corresponds to the designated number of copies are first printed. Thereafter, only the designated number of copies of the body are printed. Note that the order of printing is not limited to this. For example, only bodies may be first printed, and thereafter, only covers may be printed. An inserter in which covers are placed and an inserter in which sheet bundles (bodies) are placed are separated. Therefore, when case binding is performed in the off-line job, the off-line job can be advantageously more easily performed by printing covers and bodies separately.

(Description of Off-Line Process after Job Separation)

Figure 12:
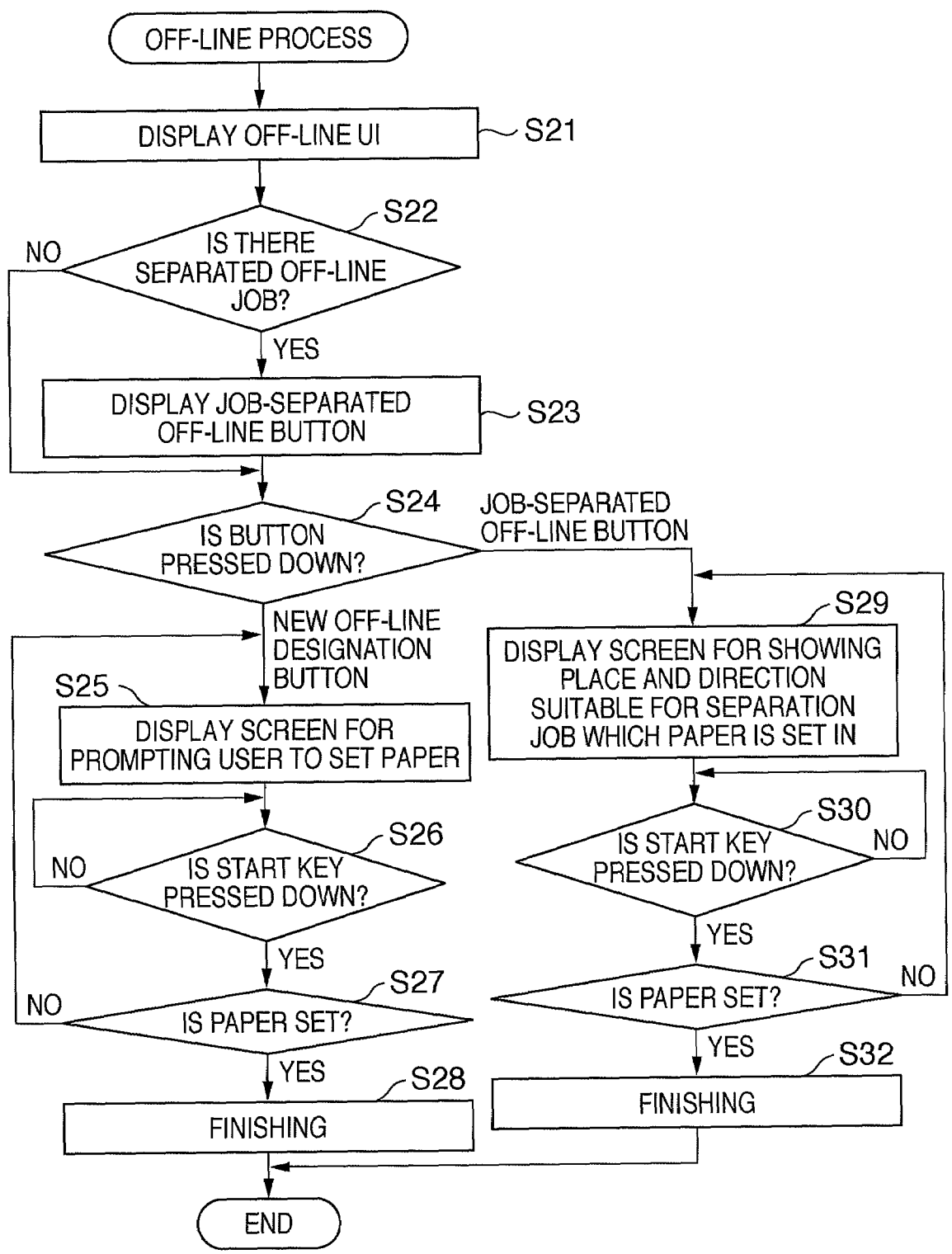
FIG. 12 is a flowchart explaining an off-line process after job separation in the printing system according to the embodiment.

FIG. 12 is a flowchart for describing an off-line process after job separation in the printing system according to this embodiment.

In step S21, a screen for setting a sheet process is displayed on the touch panel unit 7001 of the console unit 204 as shown in FIG. 8. Next, in step S22, it is determined whether or not an off-line job obtained by job separation exists. When the off-line job does not exist, the process proceeds to step S24, in which an off-line job designated on the sheet process setting screen of FIG. 8 is executed. Specifically, when a button for a sheet process desired by the user is pressed down on the screen of FIG. 8, the process proceeds to step S25, in which a screen for prompting the user to set a bundle of sheets to be subjected to the sheet process is displayed on the console unit 204. In accordance with the screen, the user sets a bundle of sheets that the user desires to process, and then presses down the start key 721 of the console unit 204. Thereby, the process proceeds from step S26 to step S27, in which a sheet processing apparatus 200 determines whether or not sheets are set. When sheets are set, the process proceeds to step S28, in which the finishing process designated in step S24 is executed.

On the other hand, when it is determined in step S22 that an off-line job exists as a result of job separation, the process proceeds to step S23, in which the sheet process setting button 709 (FIG. 7) accompanying job separation is displayed on the touch panel unit 7001.

FIG. 13 is a diagram showing an exemplary screen that is displayed on the touch panel unit 7001 in step S24 after the sheet process setting button 709 is pressed down in step S23.

Here, a content substantially the same as that of the sheet process selection screen of FIG. 8 is displayed, except that a job-separated sheet process button 1301 indicating a sheet process generated by job separation is provided on the screen of FIG. 13.

Here, when the job-separated sheet process button 1301 is pressed down, the process proceeds to from step S24 to step S29, in which a printed sheet setting method corresponding to an off-line job that is the separated job is displayed.

FIG. 14 is a diagram showing an exemplary screen that is displayed on the touch panel unit 7001 in step S29 after the "job-separated sheet process button" 1301 is pressed down in FIG. 13 (in step S24).

In this example, it is assumed that the separated job is a case binding process, for which the number of copies is set to be five and the number of sheets in the body of each copy is set to be 20. It is also assumed that, in this point in time, a total number of five covers and a total number of 100 (=20×5) printed sheets of bodies exist at the user's hand or on a discharge tray of the printing system 1000.

The screen of FIG. 14 shows that, of these printed sheets, sheet bundles of bodies are to be set in a paper feed deck (inserter 1) of the inserter 200-3d before a case binding device 200-3b, and cover sheets are to be set in an inserter (inserter 2) (406 of FIG. 4) of the case binding device 200-3b.

Thereafter, the user sets sheet bundles into respective designated inserters in accordance with the instruction. Thereafter, the user presses down a start button 1401 shown in FIG. 14. Thereby, the process advances from step S30 to step S31 of FIG. 12, in which the sheet processing apparatus 200 checks whether or not sheets are set in each inserter designated on the screen of FIG. 14. Here, if it is determined that sheets are set in each inserter, the process advances to step S32, in which the designated finishing process is executed. On the other hand, it is determined in step S32 that sheet are not set, the process advances to step S29, in which the sheet process screen of FIG. 14 is displayed again and the user is prompted to set sheets.

Note that, in step S30, when a cancel button 1402 shown in FIG. 14 is pressed down, the job-separated sheet process is canceled and the process is ended.

Other Embodiments

The embodiments of the present invention have been described in detail. Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a website on the Internet using a browser on a client computer, and downloading the program from the website to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different websites. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a website via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted in or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-16841, filed Jan. 28, 2008, which is hereby incorporated by reference herein in its entirety.

What is claimed is:

1. A printing system having a printing apparatus and a post-processing apparatus connected to the printing apparatus, the system comprising:
    a reception unit configured to receive an in-line job set to perform a printing process by the printing apparatus and a post-process by the post-processing apparatus with respect to a sheet printed by the printing process;
    a job separation unit configured to determine whether or not the in-line job is to be separated into the printing process by the printing apparatus and an off-line process of performing the post-process by the post-processing apparatus without performing the printing process by the printing apparatus; and
    a print control unit configured to, in a case that said job separation unit determines that the separation is not to be performed, cause the printing apparatus to execute the printing process of the in-line job and the post-processing apparatus to execute the post-process of the in-line job,
    wherein in a case that said job separation unit determines that the separation is to be performed, said print control unit causes the printing apparatus to execute the printing process and holds process information for executing the off-line process, and
    said print control unit, when receiving a user's instruction to execute the off-line process, performs control such that the off-line process is executed with respect to the sheet printed by the printing process, based on the held process information.

2. The printing system according to claim 1, wherein said job separation unit makes the determination based on whether or not the post-process set in the in-line job is included in an off-line process or processes that can be executed by the printing system.

3. The printing system according to claim 1, wherein said job separation unit determines that the in-line job can be separated, in a case that the post-processing apparatus that executes the post-process set in the in-line job is executing another job.

4. The printing system according to claim 1, wherein said job separation unit determines that the in-line job can be separated, in a case that the in-line job includes a post-process with respect to a predetermined number or more of copies of sheets loaded.

5. The printing system according to claim 1, wherein a printing process corresponding to the off-line process of the in-line job by said printing control unit, in a case that the off-line process includes a case binding process, includes a process of continuously printing a designated number of covers and a designated number of bodies that are to be used in the case binding process.

6. A method for controlling a printing system having a printing apparatus and a post-processing apparatus connected to the printing apparatus, the method comprising:
    a receiving step of receiving an in-line job set to perform a printing process by the printing apparatus and a post-process by the post-processing apparatus with respect to a sheet printed by the printing process;
    a job separation step of determining whether or not the in-line job is to be separated into the printing process by the printing apparatus and an off-line process of performing the post-process by the post-processing apparatus without performing the printing process by the printing apparatus; and
    a print control step of, in a case that it is determined in said job separation step that the separation is not to be performed, causing the printing apparatus to execute the printing process of the in-line job and the post-processing apparatus to execute the post-process of the in-line job,
    wherein in a case that it is determined in said job separation step that the separation is to be performed, the print control step includes causing the printing apparatus to execute the printing process and holding process information for executing the off-line process, and
    the pint control step, when receiving a user's instruction to execute the off-line process, includes performing control such that the off-line process is executed with respect to the sheet printed by the printing process, based on the held process information.

7. The method according to claim 6, wherein said job separation step includes making the determination based on whether or not the post-process set in the in-line job is included in an off-line process or processes that can be executed by the printing system.

8. The method according to claim 6, wherein said job separation step includes determining that the in-line job can be separated, in a case that the post-processing apparatus that executes the post-process set in the in-line job is executing another job.

9. The method according to claim 6, wherein said job separation step includes determining that the in-line job can be separated, in a case that the in-line job includes a post-process with respect to a predetermined number or more of copies of sheets loaded.

10. A program stored in a computer-readable storage medium, for causing a computer to execute the method according to claim 6.

11. A non-transitory computer-readable storage medium storing the program according to claim 10.

* * * * *